US00RE47525E

(19) United States
(12) Reissued Patent
Sousa et al.

(10) Patent Number: US RE47,525 E
(45) Date of Reissued Patent: Jul. 23, 2019

(54) FOLDABLE PLAYARD

(71) Applicant: SUMMER INFANT (USA), INC., Woonsocket, RI (US)

(72) Inventors: Mark James Sousa, Hope, RI (US); William A. Henderson, Holden, MA (US); Spencer P. Brown, Providence, RI (US); Anthony A. Paolo, Cranston, RI (US)

(73) Assignee: SUMMER INFANT (USA), INC., Woonsocket, RI (US)

(21) Appl. No.: 15/338,631

(22) Filed: Oct. 31, 2016

Related U.S. Patent Documents

Reissue of:
(64) Patent No.: 9,144,325
Issued: Sep. 29, 2015
Appl. No.: 14/274,798
Filed: May 12, 2014

(51) Int. Cl.
*A47D 7/00* (2006.01)
*A47D 9/00* (2006.01)
*A47D 13/06* (2006.01)

(52) U.S. Cl.
CPC ..... *A47D 13/063* (2013.01); *A47D 7/002* (2013.01); *A47D 9/005* (2013.01); *A47D 13/06* (2013.01)

(58) Field of Classification Search
CPC ..... A47D 13/063; A47D 7/002; A47D 9/005; A47D 13/06
USPC ..... 5/98.1, 98.3, 99.1; 108/115, 118
See application file for complete search history.

(56) References Cited

U.S. PATENT DOCUMENTS 3,162,460 A * 12/1964 Davidson ..... A47D 13/063 280/31
3,789,439 A * 2/1974 Berg ..... A47D 9/005 5/93.2
3,924,280 A * 12/1975 Vaiano ..... A47D 13/063 5/98.1
4,186,454 A * 2/1980 Cone ..... 5/99.1
4,202,065 A * 5/1980 Sullivan ..... 5/99.1
4,645,183 A * 2/1987 Rattray ..... A47D 13/063 256/25
5,025,517 A 6/1991 Johnson
6,125,483 A * 10/2000 Stroud ..... A47D 13/063 135/128
6,343,390 B1 * 2/2002 Yang et al. ..... 5/99.1
6,421,850 B1 * 7/2002 Welsh, Jr. ..... 5/99.1
6,505,565 B1 * 1/2003 Byung ..... A47B 3/00 108/115
6,510,568 B1 * 1/2003 Drobinski ..... A47D 7/002 5/93.1

(Continued)

OTHER PUBLICATIONS

Summer Infant, Inc. Pop'nPlay Portable Playard Instruction Manual. USA: Mar. 2014 P/N/ 27390, pp. 1-4.

*Primary Examiner* — Russell D Stormer

(74) *Attorney, Agent, or Firm* — Adler Pollock & Sheehan P.C.

(57) ABSTRACT

The folding playard consists of a frame and a fabric enclosure mounted on the frame. The frame is composed of an array of scissoring tube pairs making up the sides of the structure. The fabric enclosure has the same number of sides as the frame and an integral bottom floor. To lock the playard in the "in use" position, a plastic hook clip, which is connected to the bottom floor fabric and the top of the structure is engaged. This strap ensures the tubes are locked in the "in use" position and the structure cannot collapse.

26 Claims, 9 Drawing Sheets

(56) References Cited

U.S. PATENT DOCUMENTS

| | | | | |
|---|---|---|---|---|
| 6,997,111 | B2 * | 2/2006 | Giegerich | A47B 3/002 108/115 |
| 7,418,746 | B2 * | 9/2008 | Gehr et al. | A47D 13/063 5/98.1 |
| 7,574,757 | B2 * | 8/2009 | Song | A47D 13/063 5/93.1 |
| 7,661,157 | B2 * | 2/2010 | McCluskey et al. | 5/99.1 |
| 8,387,178 | B2 * | 3/2013 | Rivera et al. | 5/99.1 |
| 2002/0070532 | A1 | 6/2002 | Harrison et al. | |
| 2004/0237191 | A1 | 12/2004 | Clapper et al. | |
| 2005/0147463 | A1 | 7/2005 | Chen | |
| 2005/0166316 | A1 * | 8/2005 | Gehr et al. | 5/99.1 |
| 2007/0214576 | A1 | 9/2007 | Espenshade | |

* cited by examiner

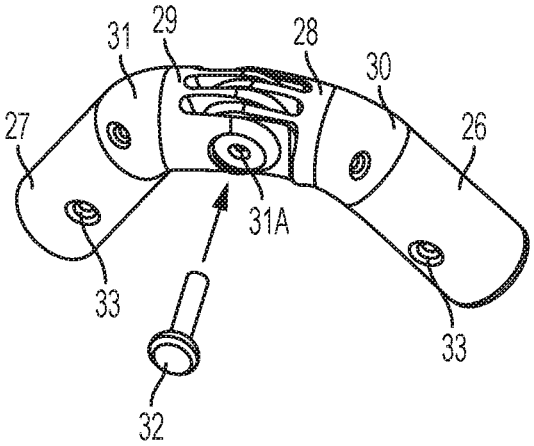
FIG. 5
AMENDED

FOLDABLE PLAYARD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

None.

FIELD OF THE INVENTION

The invention is in the field of playards for infants, toddlers, children, or pets, more specifically in the field of collapsible playards.

BACKGROUND OF THE INVENTION

Different kinds of collapsible frame structures for playards or play pens for infants, toddlers and children are known. One known structure is composed of top rails, pairs of rods arranged in an X-shape along the sides of the structure and a locking hinge arranged between each top rail and each pivot point of the rod pairs. Also known is a box structure that includes four frame legs and four upper frame joints and four lower frame joints pivotally connected to the frame legs. The structure also includes a bottom base frame with four legs radially extending from a central coupling joint, which allows the four legs to fold. U.S. Pat. No. 7,418,746 discloses a collapsible frame structure that includes a plurality of legs and paired cross-members extending between adjacent legs and a plurality of slider joints engaging the legs and pivotably attached to two adjacent cross-members. Additional United States patents disclosing collapsible play pens include U.S. Pat. Nos. 7,503,085 and 7,036,161.

SUMMARY OF THE INVENTION

The invention is a playard structure without traditional frame legs, a unitary structure that collapses, i.e., folds together, and can be set up with minimal effort, even by a six year old. In its collapsed and not usable position, it is compact. When it is unfolded, it expands to form a legless structure that stands on its own and does not collapse. It is composed of collapsible or foldable frame having a plurality of scissoring tube pairs vertically extending and forming sides arranged in a generally polygonal manner about a vertical axis to form the sides of the playard. Each of the tube pairs are coupled together by means of a pivot joint disposed midway between the ends of each tube in the pair. A plurality of top knuckle linkages that couple the top end of each tube in each tube pair to the top end of the tube in the tube pair immediately adjacent to it and a plurality of bottom knuckle linkages that couple the bottom end of each tube in each tube pair to the bottom end of the tube in the tube pair immediately adjacent to it are provided. The knuckle linkages are composed of a pair of tube receiving sockets connected to each other by means of a hinge. The hinge is composed of a pair of connected tongue and groove casings, the tongues having aligned holes and being secured to each other by means of a rivet pin that extends through the aligned holes. The knuckle linkages also include a dog legged shaped spacer body disposed between the pivot joint and each of the tube receiving sockets, creating a knuckle linkage having a substantially parabolic aspect. This forms the frame of the structure.

The invention also includes a fabric enclosure having an open top, a floor, the same number of side panels as the frame, and a fabric top railing connected to the side panels at their upper edge and affixed to the top knuckle linkages. The fabric top railing sets a fixed limit on lateral expansion of the frame. The floor of the fabric enclosure is composed of a non-mesh material selected from the group consisting of nylon and the sides of the fabric enclosure are composed of a woven nylon mesh material but other materials may be used, for example, woven nylon, nylon wire mesh, rayon, cotton, woven polyester, linen, bamboo fiber, neoprene and woven PVC. The fabric top railing is composed of a two strips of uni-directional weave nylon webbing between which is disposed the mesh side fabric of the enclosure. The fabric enclosure is attached to the frame by means of the top railing, which is affixed to the top knuckle linkages by rivets.

To maintain the structure in an upright position, frame tensioning means are provided. The frame tensioning means are composed of a plurality of depending straps, each strap connected at one end to a top knuckle linkage and formed and position to be able to encircle the bottom knuckle linkage disposed directly below it and demountably attach to the playard to create a vertical tension on the frame holding the frame upright when fastened and allowing the frame to collapse when released. The depending straps are preferably composed of a substantially non-stretchable fabric, although one of skill in the art will be able to conceive of other materials that could be employed. If fabric, the straps may be composed of nylon, heavyweight polypropylene or polyester. The frame tensioning means further includes fastening means is selected from the group consisting of clips, buckles, strap slides, strap adjusters, clasp buckles, side release buckles and quick release strap adjusters.

Additional details are provided in the detailed description below.

BRIEF DESCRIPTION OF THE DRAWINGS

FIG. 5 is a perspective view of one of the plurality of knuckle linkages included in the playard.

DETAILED DESCRIPTION

Figure 1:
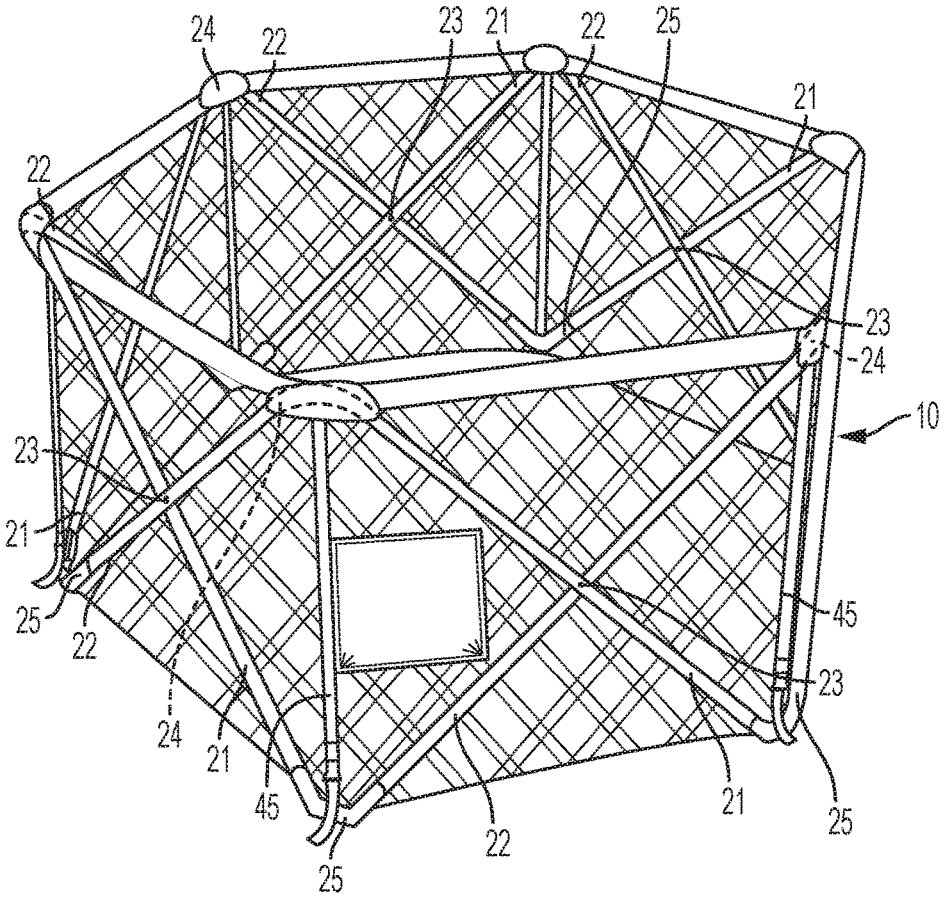
FIG. 1 is a perspective view of the playard in its upright, uncollapsed, ready for use position.
Figure 2:
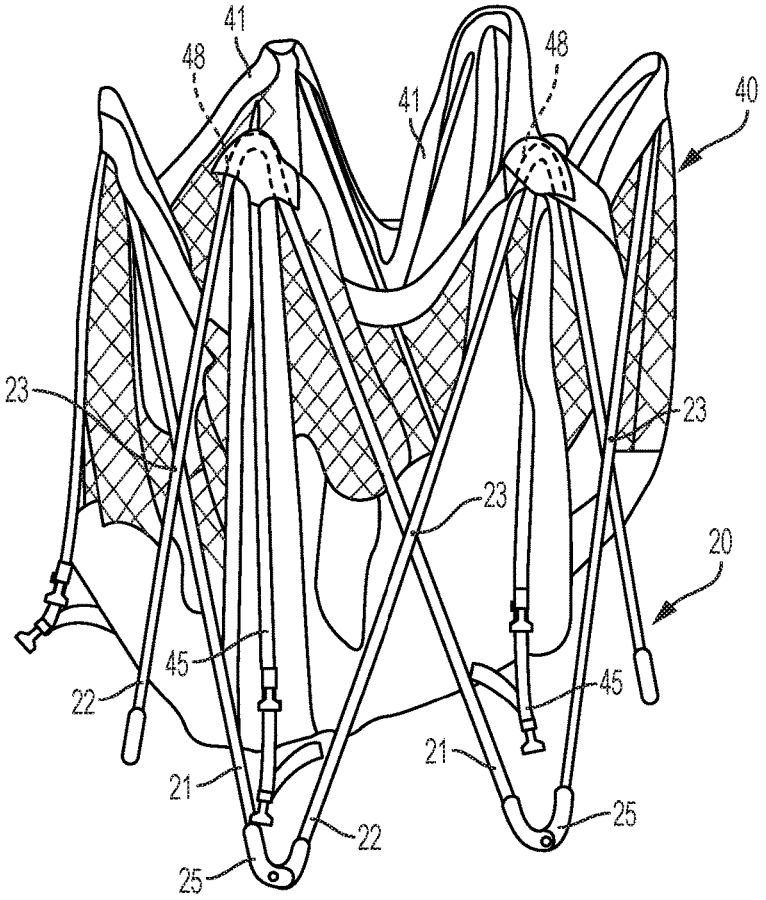
FIG. 2 is a perspective view of the playard in is partially collapsed position.

Referring to FIGS. 1 and 2, the folding playard 10 consists of a frame, 20, and a fabric enclosure, 40, mounted on the frame. The frame, 20, is composed of an array of scissoring tube pairs 21, 22 making up a total of 6 or 8 sides. These pairs of tubes are connected in the middle with a hinge pin, 23. Preferably the tubes are hollow and made of steel. Alternative materials for the tubes include aluminum, wood, resin-matrixed carbon fiber, fiberglass, resin-matrixed Teflon fiber, polycarbonate, ABS, PVC and nylon. When the tubes pivot vertically, the height of the assembly is increased and the structure collapses as shown in FIG. 2. When the tubes pivot in the horizontal direction, the structure expands and at the tubes' end of travel, the playard is expanded fully and in its use configuration as shown in FIG. 1. The height of the frame (and therefore the length of the tubes) can vary from between about 20 inches to about 48 inches.

Figure 6:
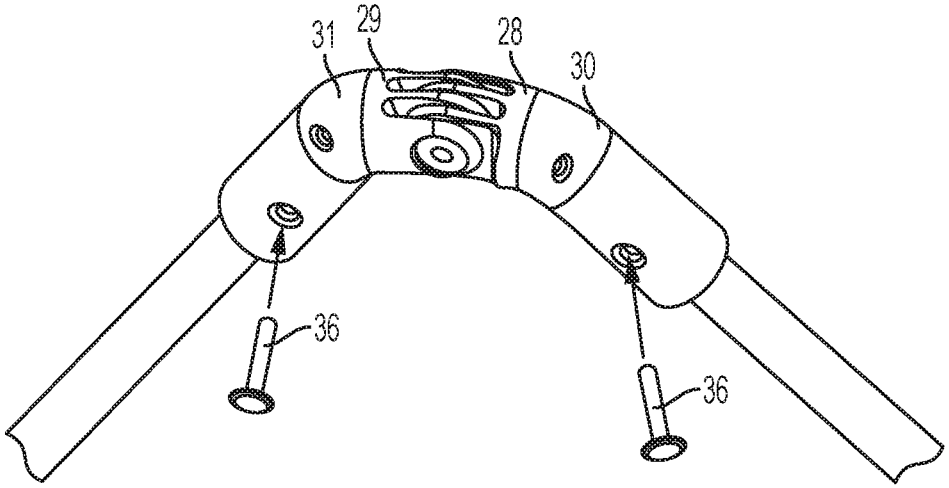
FIG. 6 is a partial perspective view of one of the top knuckle linkages and adjacent frame tubes.
Figure 7:
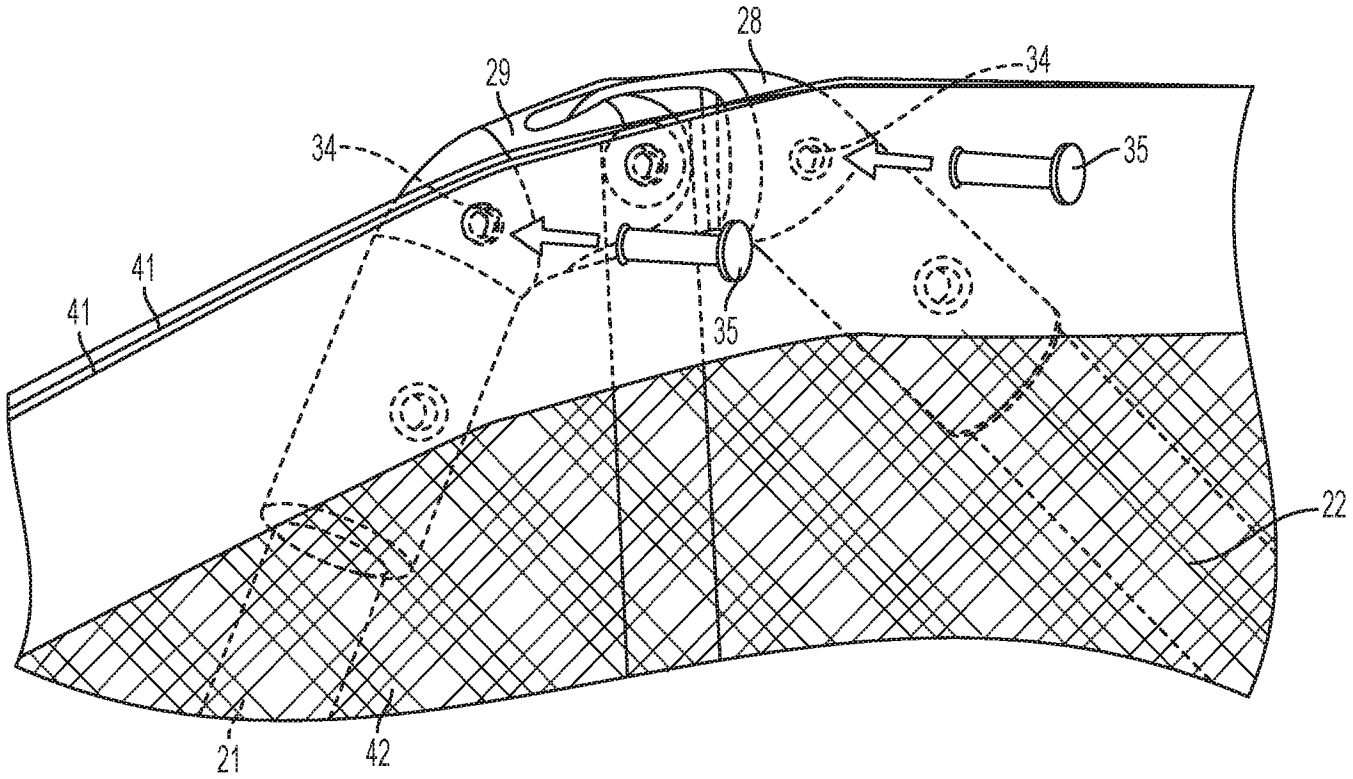
FIG. 7 is a partial perspective view of one of the top knuckle linkages and its attachment to the fabric top rail of the playard.

Each of the tube pairs 21 and 22 are joined at their top ends and their bottom ends to neighboring, i.e., adjacent, tube pair top and bottom ends by means of top and bottom knuckle linkages or knuckle hinges, 24 and 25 respectively. As best seen in FIGS. 5 and 6, knuckle linkages 24 and 25 are composed of two tube receptacles, 26 and 27, joined with a hinge that allows the knuckles to pivot vertically, which allows the tube pairs to pivot vertically to a substantially vertical orientation which collapses the horizontal floor of the playard for storing. The hinge is composed of a pair of connected tongue and groove casings, 28 and 29, and the tongues are formed with aligned holes [31] *31A*. The two casings are secured to each other by means of a rivet pin 32 that extends through the aligned holes. The top and bottom knuckle linkages are further composed of two tube receiving sockets, 26 and 27, which are formed and positioned to receive the ends of tubes 21 and 22. Receiving sockets 26 and 27 are each formed with rivet openings 33 that receive rivets 36. This secures the ends of the tubes to their receiving sockets. Positioned between receiving sockets 26 and 27 and casings 28 and 29 are a pair of dog legged shaped spacers, 30 and 31, one on each side of casings 28 and 29 and disposed between the pivot joint and each of the tube receiving sockets, creating a knuckle linkage having a substantially parabolic aspect. Spacer [hole 34] *holes 34* (*also referred to as "bores"*) are provided in spacers 30 and 31 to secure the knuckle linkages to the rail webbing as will be described below. Preferably, the knuckle linkages are composed of rigid plastic, although alternative materials may be used. FIG. 7 illustrates how the knuckle linkages are attached to the fabric top rail by means of rivets 35 that are inserted into bores 34 in the knuckles.

Figure 3:
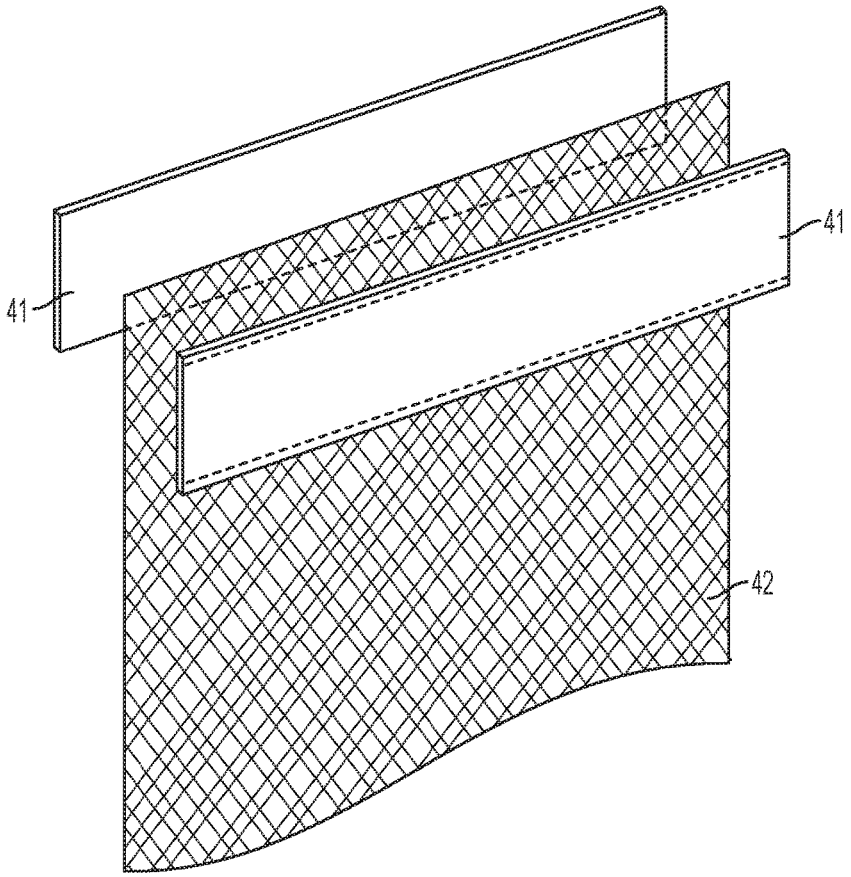
FIG. 3 is an exploded partial view of the fabric top rail showing its construction and arrangement with the mesh sides of the playard.
Figure 4:
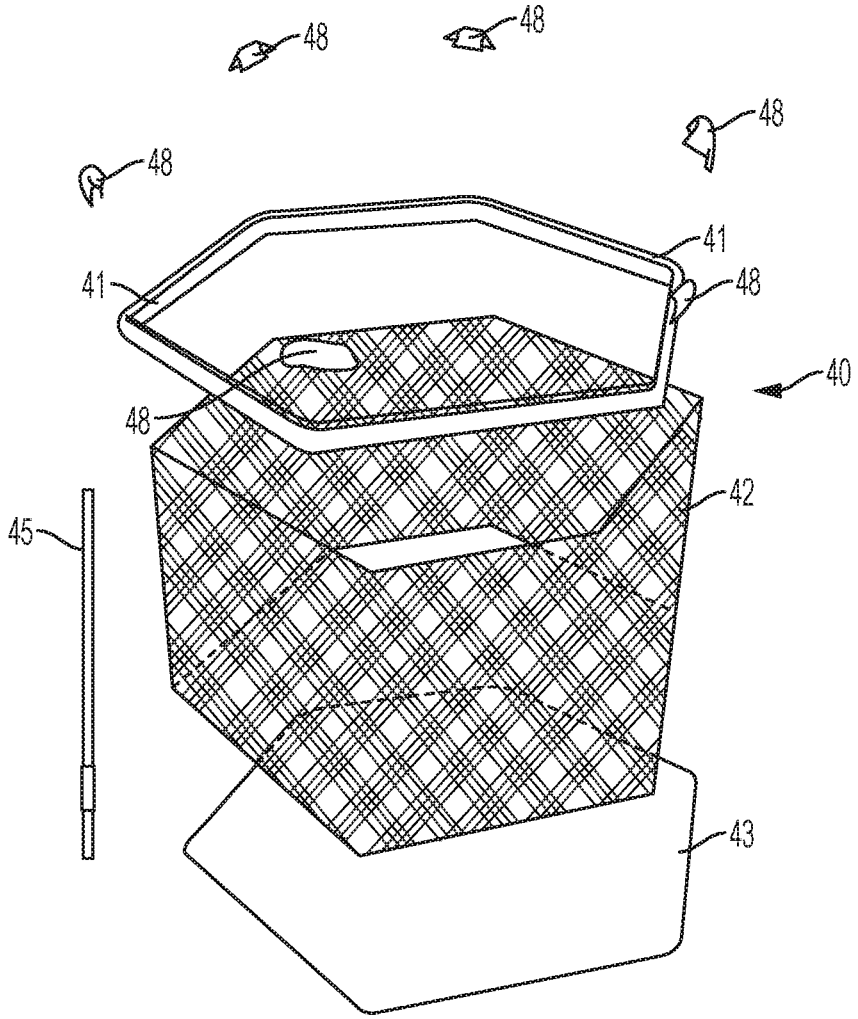
FIG. 4 is an exploded view of the fabric enclosure of the playard.

FIG. 3 shows an expanded view of the fabric enclosure, 40. The fabric enclosure, 40, has the same number of sides as the frame and an integral bottom floor. It is composed of a fabric top railing. 41, integral floor 43, fabric side panels 42 and fabric knuckle covers 48, which are sewn over the plastic knuckles and onto the fabric top rail for safety purposes. The number of side panels depends on the number of tube pairs; there has to be the same number of panels as tube pairs, so if the playard is triangular or square (or rectangular) in shape, there will be 3 side panels and three tube pairs or four side panels and fours tube pairs respectively. Floor 43 is preferably composed of nylon, most particularly 100 Denier nylon sheet, but alternatively fabrics as discussed above may be employed. Floor 43 forms tension members between the bottom knuckle linkages of the frame when fully assembled that prevent the knuckles and thereby the frame from spreading past a certain point determined by the dimensions of the floor. The floor also creates a clean environment for the infant or toddler when the playard is used outdoors. When the playard is used as a pet enclosure, a zippered door (not shown) may be provided in one of the wall panels.

Fabric side panels 42 are preferably composed of a mesh material. The mesh, when stretched between the top and bottom knuckle linkages, holds the frame in compression (and by default is held in tension. The mesh also prevents the infant or toddler from leaving the playard.

Fabric top railing 41 is composed of two strips of uni-directional weave nylon webbing between which is disposed the mesh side fabric 42 of the enclosure as best seen in FIG. 3. Fabric top railing 41 is affixed to each of the top knuckle linkages by means of rivet pins [34]. The width of top railing 41 should be in the range of 0.75 to 2.5 inches in order to create the proper tension. Preferably the width is 1.0 to 2.0 inches, more preferably in the range of 1.25 to 1.75 inches and most preferably 1.5 inches. When the playard is fully assembled, the uni-directional weave nylon webbing is held under tension. Because they cannot be stretched, the webbed top rail sets a fixed limit on the lateral extension of the frame, which in turn holds the mesh walls and floor [taunt] *taut*. The fabric top rail is permanently riveted to the top knuckle linkages as is described in relation to FIG. 6. The fabric top rail is held in tension (see FIG. 7) as the top knuckle linkages are spread apart, which causes the top and bottom knuckle linkages to approach each other, compressing the structure.

Figure 8A:
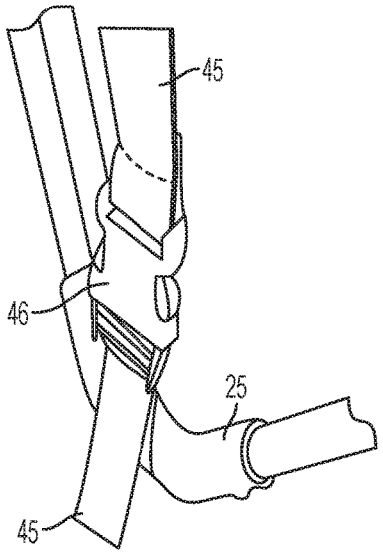
FIGS. 8A and 8B are partial perspective views of one embodiment of the frame tensioning means of the playard.
Figure 8B:
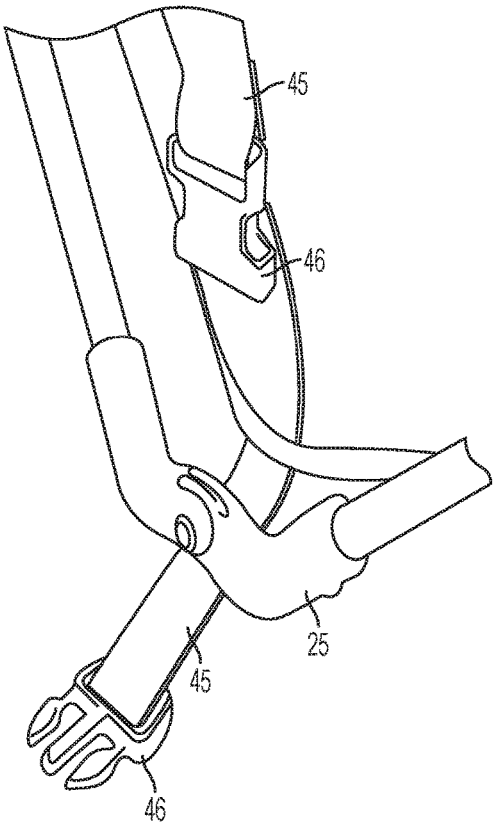
Figure 9A:
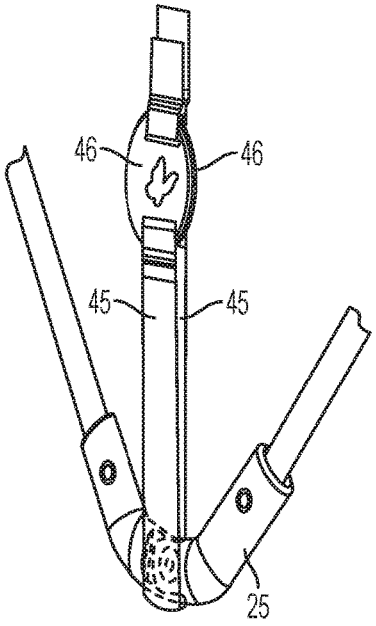
FIGS. 9A and 9B are partial perspective views of an alternate embodiment of the frame tensioning means of the playard.
Figure 9B:
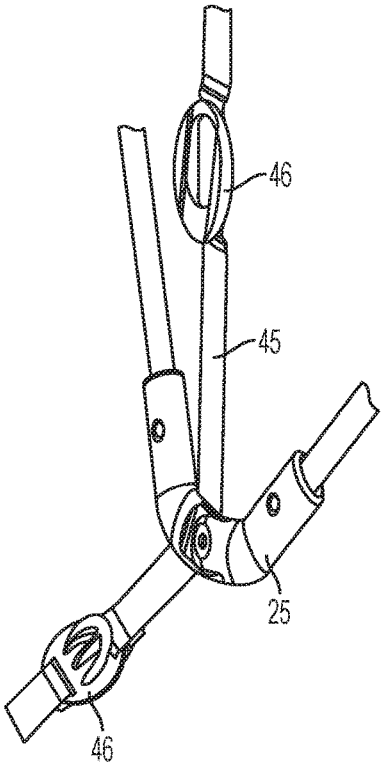
Figure 10A:
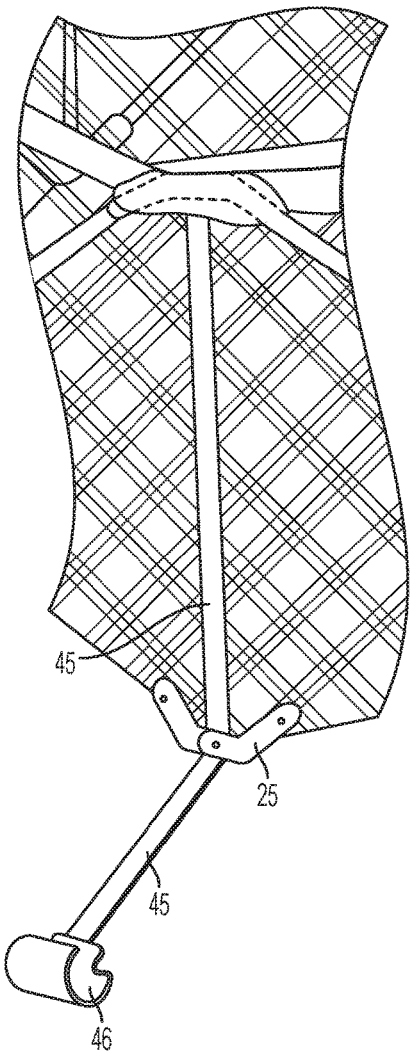
FIGS. 10A and 10B are partial perspective views of another alternate embodiment of the frame tensioning means of the playard.
Figure 10B:
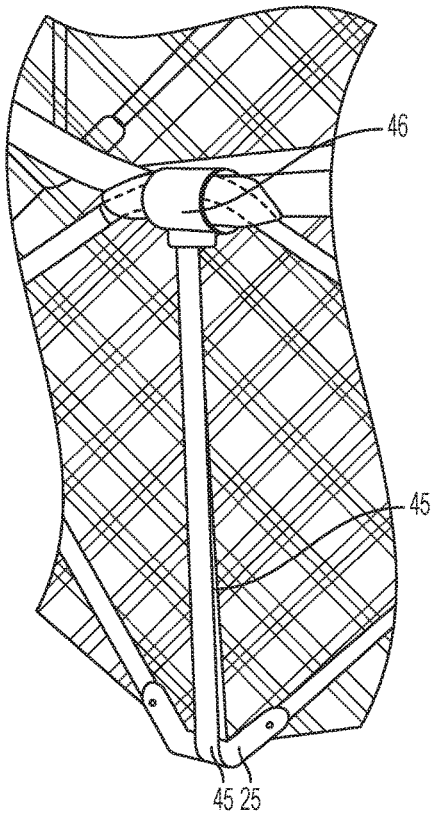

As shown in FIGS. 1, 2 and 8-10, a plurality of vertically depending fabric straps, 45 are provided to tension bias the frame to maintain it in its upright, non-collapsed, in use, position. Each strap, 45, is connected at its top end to a top knuckle linkage, such that the straps extend vertically at the intersection of the side panels. The number of straps required depends at least in part on the number of sides to the structure. For a six sided playard for example, a minimum of three straps will maintain the frame in its upright in use position. For an eight sided playard, a minimum of four straps will work. Preferably however, the playard will have the same number of straps as top knuckles, so six straps are particularly preferred for a six sided playard although the structure will work with three, better with four, even better with five and ideally with six. Eight straps are particularly preferred for an eight sided playard although the structure will work with four, better with five or six, even better with seven and ideally with eight. Each strap, 45, depends from a knuckle linkage and is long enough to encircle the bottom knuckle linkage disposed directly below it. The strap may be provided with a fastener, 46, that permits the strap to be removably fastened to itself. FIGS. 8 and 9 illustrated two embodiments of this arrangement. Alternatively, as shown in FIG. 10, instead of being secured to itself, the strap may extend from the top knuckle around the bottom knuckle and back up to the top knuckle again and be provided with a fastener formed to clip onto the top knuckle. These vertically depending fabric straps may be composed of webbed nylon, heavyweight polypropylene or polyester, preferably of webbed. They may be formed from the same material as a backpacking strap. Their width may be variable. They must at least be wide enough to create the frame tension when fastened. One quarter inch to three inch straps are preferred. Clipping the straps 45 compresses the top and bottom knuckles, creating the compression required to hold the frame upright. It also creates tension between adjacent knuckles by widening the space between them. The choice of fastener is not critical. Exemplary include buckles, strap slides, strap adjusters, clasp buckles, side release buckles and quick release strap adjusters. Side release buckles are preferred but as long as the fastener is formed and positioned to demountably fasten to itself to create a vertical tension on the frame to hold it in it uncollapsed position and to release the vertical tension on the frame to allow the frame to collapse it will suffice.

These figures illustrate how the components work to maintain the playard in an upright position without the use of legs. The tops of the pairs of cross frame tubes 21 and 22 are connected to the fabric top railing 41 via the top knuckle linkages as already described. When straps 45 are placed under bottom knuckles 25 and tightened, the top and bottom knuckles of each corner of the playard compress in the vertical direction, which expands the distance between the tops and bottoms of each tube pair 21 and 22 in the horizontal direction. This expansion is stopped by the fabric top rail 41.

We claim:

[1. A playard comprising a collapsible frame having a plurality of scissoring tube pairs vertically extending and forming sides arranged in a generally polygonal manner about a vertical axis to form the sides of the playard, each of the tube pairs coupled by means of a pivot joint disposed midway between the ends of each tube in the pair;

a plurality of top knuckle linkages that couple the top end of each tube in each tube pair to the top end of the tube in the tube pair immediately adjacent to it;

a plurality of bottom knuckle linkages that couple the bottom end of each tube in each tube pair to the bottom end of the tube in the tube pair immediately adjacent to it;

a fabric enclosure having an open top, a floor, the same number of sides as the frame, and a fabric top railing connected to the sides at the top thereof and affixed to the top knuckle linkages, thereby setting a fixed limit on lateral expansion of the frame; and frame tensioning means composed of a plurality of depending fabric straps, each strap connected at one end to a top knuckle linkage and formed and positioned to encircle the bottom knuckle linkage disposed directly below it and demountably attach to the playard to create a vertical tension on the frame holding the frame upright when fastened and allowing the frame to collapse when released.]

[2. The playard according to claim 1 wherein each of the top and bottom knuckle linkages comprises a pair of tube receiving sockets connected to each other by means of a hinge.]

[3. The playard according to claim 2 wherein the hinge is composed of a pair of connected tongue and groove casings, the tongues having aligned holes and being secured to each other by means of a rivet pin that extends through the aligned holes.]

[4. The playard according to claim 3 additionally comprising a dog legged shaped spacer body disposed between the pivot joint and each of the tube receiving sockets, creating a knuckle linkage having a substantially parabolic aspect.]

[5. The playard according to claim 1 wherein the floor of the fabric enclosure is composed of a non-mesh nylon material and the sides of the fabric enclosure are composed of a woven nylon mesh material.]

[6. The playard according to claim 2 wherein the floor of the fabric enclosure is composed of a non-mesh nylon material and the sides of the fabric enclosure are composed of woven nylon mesh material.]

[7. The playard according to claim 1 wherein the fabric top railing is composed of a two strips of uni-directional weave nylon webbing between which is disposed the mesh side fabric of the enclosure.]

[8. The playard according to claim 7 wherein the fabric top railing is affixed to the top knuckle linkages by rivets.]

[9. The playard according to claim 1 wherein the vertically depending fabric straps of the frame tensioning means are composed of nylon, heavyweight polypropylene or polyester.]

[10. The playard according to claim 9 wherein the frame tensioning means includes fastening means is selected from the group consisting of clips, buckles, strap slides, strap adjusters, clasp buckles, side release buckles and quick release strap adjusters.]

[11. The playard according to claim 10 wherein the fastening means is a side release buckle.]

*12. A playard comprising:*

*a collapsible frame having a plurality of scissoring tube pairs vertically extending and forming sides arranged in a generally polygonal manner to form the sides of the playard;*

*a plurality of top knuckle linkages that couple the top end of each tube in each tube pair to the top end of the tube in the tube pair immediately adjacent to it;*

*a plurality of bottom knuckle linkages that couple the bottom end of each tube in each tube pair to the bottom end of the tube in the tube pair immediately adjacent to it;*

*the top and bottom knuckle linkages being composed of a pair of tube-receiving sockets connected to each other by means of a hinge, and a dog-leg shaped spacer body disposed between each tube receiving socket and the hinge;*

*the hinge being composed of a pair of connected tongue and groove casings, the tongues having aligned holes and being secured to each other by a rivet pin that extends through the aligned holes;*

*a mesh fabric enclosure having an open top, a non-mesh floor, the same number of sides as the frame, and a fabric top railing connected to the top of the mesh fabric sides and affixed to the top knuckle linkages, thereby setting a fixed limit on lateral expansion of the frame;*

*the non-mesh floor forming a tension member between the bottom knuckle linkages of the frame when fully assembled; and*

*frame tensioning means to maintain the collapsible frame in an upright position.*

*13. The playard according to claim 12 wherein the frame tensioning means comprises a plurality of straps each connected at its top end to a top knuckle linkage and extending vertically at an intersection of the side panels.*

*14. The playard according to claim 13, wherein each strap is formed and positioned to be able to encircle the bottom knuckle linkage disposed directly below it.*

*15. The playard according to claim 13, wherein each strap is formed and positioned to be able to encircle the bottom knuckle linkage disposed directly below it.*

*16. The playard according to claim 13, wherein the plurality of straps are demountably attached to the playard*

*to create a vertical tension on the frame holding the frame upright when fastened and allowing the frame to collapse when released.*

*17. The playard according to claim 13, wherein the plurality of straps are demountably attached to the playard.*

*18. The playard according to claim 14, wherein each strap is provided with a fastener selected from the group consisting of buckles, strap slides, strap adjusters, clasp buckles, side release buckles and quick release strap adjusters.*

*19. The playard according to claim 15, wherein each strap is provided with a fastener selected from the group consisting of buckles, strap slides, strap adjusters, clasp buckles, side release buckles and quick release strap adjusters.*

*20. The playard according to claim 16, wherein each strap is provided with a fastener selected from the group consisting of buckles, strap slides, strap adjusters, clasp buckles, side release buckles and quick release strap adjusters.*

*21. The playard according to claim 17, wherein each strap is provided with a fastener selected from the group consisting of buckles, strap slides, strap adjusters, clasp buckles, side release buckles and quick release strap adjusters.*

*22. The playard according to claim 18, wherein the mesh fabric enclosure is composed of woven nylon mesh material.*

*23. The playard according to claim 19, wherein the mesh fabric enclosure is composed of woven nylon mesh material.*

*24. The playard according to claim 20, wherein the mesh fabric enclosure is composed of woven nylon mesh material.*

*25. The playard according to claim 21, wherein the mesh fabric enclosure is composed of woven nylon mesh material.*

*26. The playard according to claim 22, wherein the fabric top railing is composed of two strips of uni-directional weave nylon webbing between which is disposed the mesh side fabric of the enclosure.*

*27. The playard according to claim 23, wherein the fabric top railing is composed of two strips of uni-directional weave nylon webbing between which is disposed the mesh side fabric of the enclosure.*

*28. A playard comprising:*

*a collapsible frame having a plurality of scissoring tube pairs vertically extending and forming sides arranged in a generally polygonal manner to form the sides of the playard, each of the tube pairs coupled by means of a pivot joint disposed midway between the ends of each tube in the pair;*

*a plurality of top knuckle linkages that couple the top end of each tube in each tube pair to the top end of the tube in the tube pair immediately adjacent to it;*

*a plurality of bottom knuckle linkages that couple the bottom end of each tube in each tube pair to the bottom end of the tube in the tube pair immediately adjacent to it;*

*a mesh fabric enclosure having an open top, a floor, the same number of sides as the frame, and a fabric top railing connected to the sides of the mesh fabric enclosure and affixed to the top knuckle linkages, thereby setting a fixed limit on lateral expansion of the frame; and*

*frame tensioning means composed of a plurality of depending fabric straps, each strap connected at one end to a top knuckle linkage and formed and positioned to encircle the bottom knuckle linkage to hold the frame upright when fastened and allow the frame to collapse when released, each of the top and bottom knuckle linkages comprising a pair of tube receiving sockets connected to each other by means of a hinge.*

*29. The playard according to claim 28 wherein the hinge is composed of a pair of connected tongue and groove casings, the tongues having aligned holes and being secured to each other by means of a rivet pin that extends through the aligned holes.*

*30. The playard according to claim 29 additionally comprising a dog legged shaped spacer body disposed between the hinge and each of the tube receiving sockets, creating a knuckle linkage having a substantially parabolic aspect.*

*31. The playard according to claim 28, wherein the floor of the fabric enclosure is composed of a non-mesh nylon material and the sides of the fabric enclosure are composed of a woven nylon mesh material.*

*32. The playard according to claim 30 wherein the floor of the fabric enclosure is composed of a non-mesh nylon material and the sides of the fabric enclosure are composed of a woven nylon mesh material.*

*33. The playard according to claim 31 wherein the fabric top railing is composed of two strips of uni-directional weave nylon webbing between which is disposed the mesh side fabric of the enclosure.*

*34. The playard according to claim 32 wherein the fabric top railing is composed of two strips of uni-directional weave nylon webbing between which is disposed the mesh side fabric of the enclosure.*

*35. The playard according to claim 28 wherein the straps of the frame tensioning means are fabric straps and are composed of nylon, polypropylene or polyester.*

*36. The playard according to claim 35, wherein the straps of the frame tensioning means include fastening means selected from the group consisting of clips, buckles, strap slides, strap adjusters, clasp buckles, side release buckles and quick release strap adjusters.*

*37. The playard according to claim 36, wherein the fastening means is a side release buckle.*

* * * * *